United States Patent [19]
Takatori et al.

[11] Patent Number: 6,040,889
[45] Date of Patent: Mar. 21, 2000

[54] LIQUID CRYSTAL DISPLAY WITH CONTINUOUS GRAYSCALE, WIDE VIEWING ANGLE, AND EXCEPTIONAL SHOCK RESISTANCE

[75] Inventors: Ken-Ichi Takatori; Ken Sumiyoshi, both of Tokyo, Japan

[73] Assignee: NEC Corporation, Tokyo, Japan

[21] Appl. No.: 08/997,232

[22] Filed: Dec. 23, 1997

[30] Foreign Application Priority Data

Dec. 25, 1996 [JP] Japan .................................. 8-345168

[51] Int. Cl.⁷ .................................................. C09K 19/02
[52] U.S. Cl. ........................................ 349/174; 349/172
[58] Field of Search .................................. 349/172, 174

[56] References Cited

U.S. PATENT DOCUMENTS

| | | | |
|---|---|---|---|
| 5,046,830 | 9/1991 | Nakanowatari | 359/90 |
| 5,316,694 | 5/1994 | Murashiro et al. | 252/299.61 |
| 5,490,000 | 2/1996 | Tanaka et al. | 359/56 |
| 5,534,190 | 7/1996 | Johno et al. | 252/299.65 |
| 5,568,299 | 10/1996 | Yoshihara et al. | 359/100 |
| 5,617,229 | 4/1997 | Yamamoto et al. | 349/42 |
| 5,705,094 | 1/1998 | Takeuchi et al. | 252/299.01 |
| 5,719,653 | 2/1998 | Minato et al. | 349/174 |
| 5,723,069 | 3/1998 | Mineta et al. | 349/174 |
| 5,764,328 | 6/1998 | Kawada et al. | 349/174 |
| 5,784,140 | 7/1998 | Lee | 349/174 |
| 5,895,108 | 4/1999 | Tanaka | 349/173 |
| 5,897,189 | 4/1999 | Sako et al. | 349/171 |

FOREIGN PATENT DOCUMENTS

| | | |
|---|---|---|
| 1-152430 | 6/1989 | Japan . |
| 6-194625 | 7/1994 | Japan . |
| 7-64056 | 3/1995 | Japan . |
| 7-140493 | 6/1995 | Japan . |
| 7-333658 | 12/1995 | Japan . |
| 8-328046 | 12/1996 | Japan . |
| 9-50048 | 2/1997 | Japan . |

OTHER PUBLICATIONS

Y. Suzuki et al., Electronics (Tokyo) Journal, Mar. 1994, pp. 45–48.
T. Tanaka et al., SID 94 Digest, 1994, pp. 430–433.

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

A novel liquid crystal display device which enables continuous gray-scale display, has a wide viewing angle and readily allows an active-matrix drive. The liquid crystal display device has a pair of substrates and a liquid crystal material having an antiferroelectric phase sandwiched between said pair of substrates, at least one of the substrates undergoing an aligning process. In the liquid crystal display element, a natural helical pitch of the liquid crystal material is smaller than a gap between the substrates, and moreover, smaller than twice a lower-limit wavelength of the wavelength range of light used in the liquid crystal display device.

16 Claims, 13 Drawing Sheets

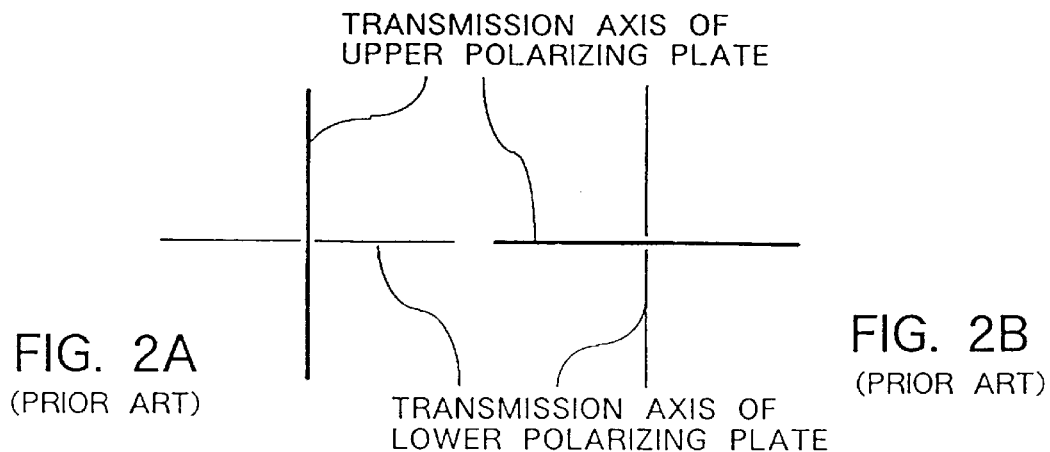
FIG. 2A (PRIOR ART)
FIG. 2B (PRIOR ART)
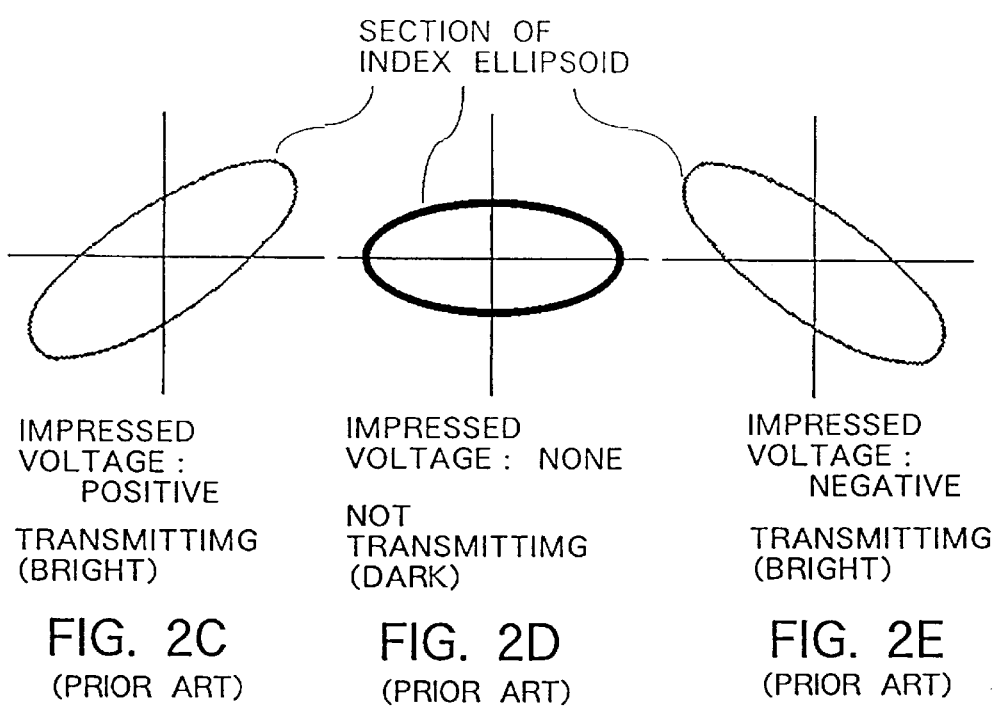
FIG. 2C (PRIOR ART)
FIG. 2D (PRIOR ART)
FIG. 2E (PRIOR ART)

FIG. 3A
(PRIOR ART)
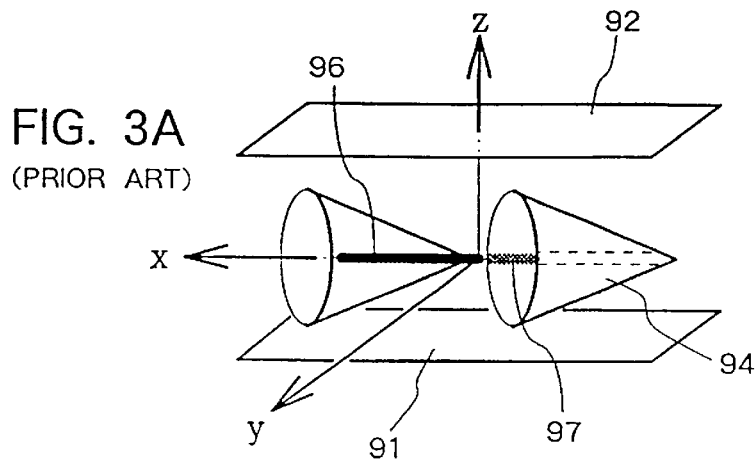
FIG. 3B
(PRIOR ART)
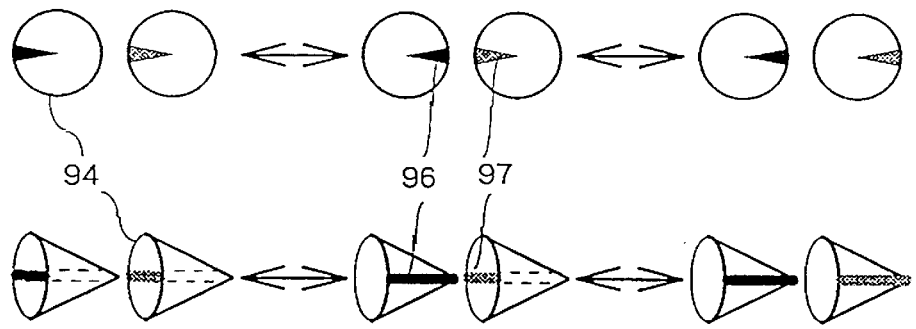
FIG. 3C
(PRIOR ART)
FIG. 3D
(PRIOR ART)
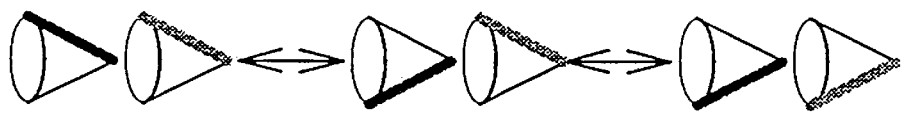
FIG. 3E
(PRIOR ART)
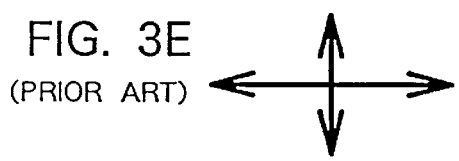

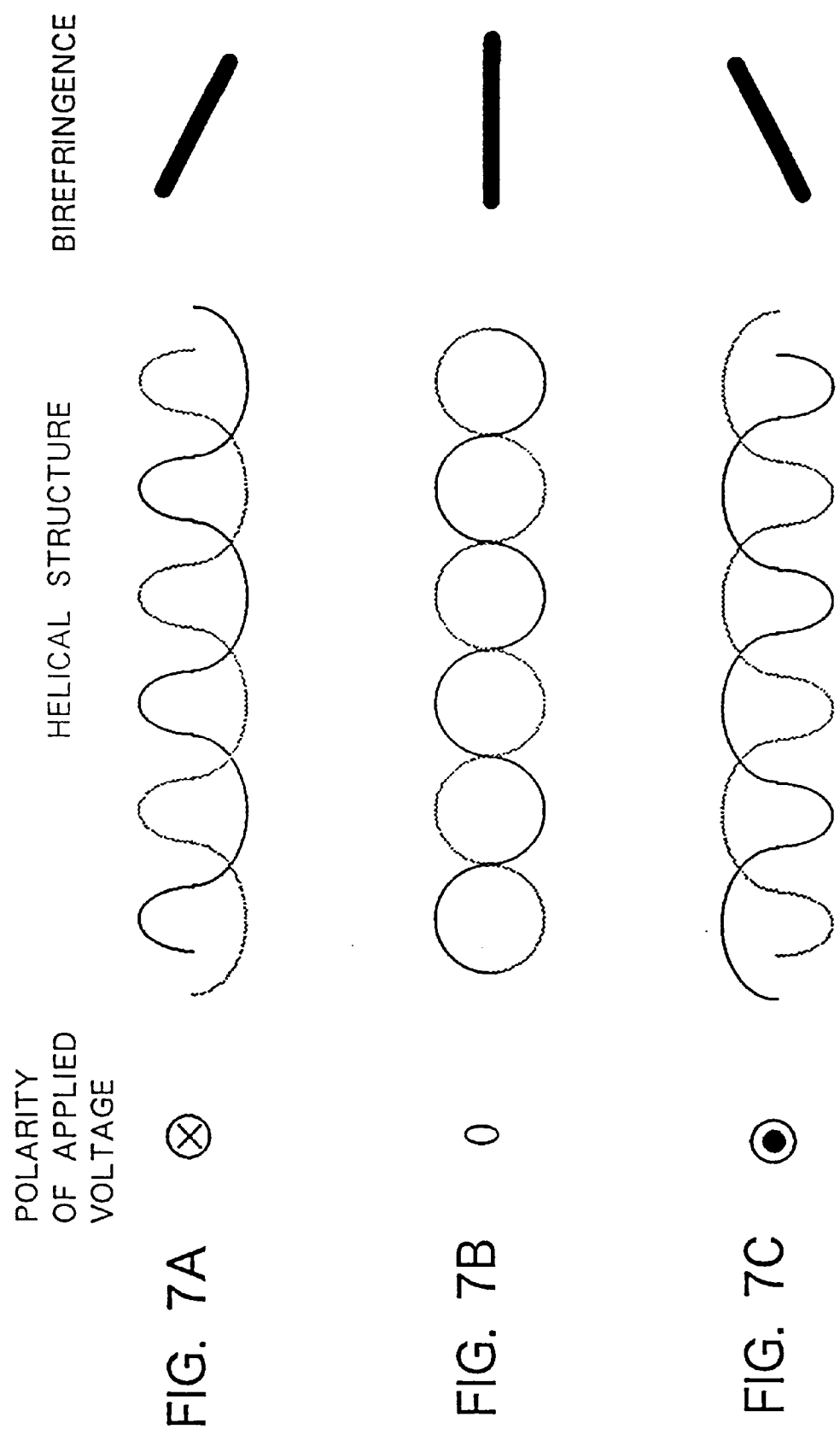

−20℃   59℃   82℃
Cry. ⟷ SmC$_A$* ⟷ N* ⟷ Iso.

LIQUID CRYSTAL DISPLAY WITH CONTINUOUS GRAYSCALE, WIDE VIEWING ANGLE, AND EXCEPTIONAL SHOCK RESISTANCE

BACKGROUND OF THE INVENTION

1. Field of the Invention

The present invention relates to a liquid crystal display device, and particularly relates to a novel liquid crystal display device that uses liquid crystal material having an antiferroelectric phase.

2. Description of the Related Art

Liquid crystal displays currently being manufactured principally include multiplex-driven STN (super twisted nematic) liquid crystal displays and TN (twisted nematic) liquid crystal displays that are active-matrix driven by TFT (thin-film transistors). These liquid crystal displays, however, lack sufficient response speed during half-tone display, and this has brought attention to the need for faster devices.

Given this situation, ferroelectric liquid crystal having a chiral smectic C-phase is receiving attention, and surface-stabilized ferroelectric liquid crystal (SSFLC) devices which use ferroelectric liquid crystal are also coming into practical use. Display devices that use this SSFLC are principally limited to switching between the two states of bright and dark, and while they have a memory property, they are not capable of gray-scale display. Methods have been proposed to produce gray-scale display with a SSFLC by controlling multidomains having differing threshold values, but such methods cannot provide continuous gray-scales. Moreover, ferroelectric liquid crystal is not shock-resistant, and even the slightest shock causes variation in the liquid crystal orientation. Some currently commercialized SSFLC displays actually incorporate heaters for initializing a disordered orientation state.

One known means of solving this problem is a liquid crystal display that employs deformed helix ferroelectrics (DHF) such as the devices described in 'Advances in Liquid Crystal Research and Applications' by Ostovski et al. (Oxford/Budapest, 1980, p. 469) and in Japanese Patent Laid-open No. 152430/89 (JP, A, 1-152430). A liquid crystal display that employs this DHF mode uses ferroelectric liquid crystal in which the natural helical pitch in a ferroelectric phase (SmC*-phase), which is formed with smectic A-phase molecules at a tilt, is sufficiently short, i.e., shorter than the cell gap d. Due to the sufficiently short helical pitch, the helix is not constrained by surface stabilization in a DHF-mode liquid crystal display. FIG. 1 is a perspective that presents a schematic view of the structure of a conventional ferroelectric liquid crystal display device using DHF mode.

In the liquid crystal display device shown in FIG. 1, liquid crystal layers are sandwiched between a pair of transparent substrates 81 and 82, and transparent electrodes 83 are formed on each of the opposing surfaces of substrates 81 and 82. Liquid crystal molecules 86 within the liquid crystal layers describe cone-shaped loci, and these loci are therefore drawn as cones 84 in the figure. In addition, the direction of spontaneous polarization of liquid crystal molecules 86 is shown in the figure by arrows 85.

As shown in FIG. 1, the orientation of the liquid crystal in DHF-mode liquid crystal display devices is most typically in a 'bookshelf' arrangement (layer structure 88), and in addition, is aligned so as to describe helices in a direction parallel to the substrate surface. In such a liquid crystal display device, however, when the helical pitch of the liquid crystal orientation corresponds to the wavelength range of visible light, a stripe pattern appears and a diffraction grating is formed. When the helical pitch is made shorter than the wavelength range of visible light (preferably, shorter than a half-wavelength $\lambda/2$) this diffraction is minimized, and the apparent refractive index is equalized. In other words, the liquid crystal can be treated in the same way as a medium having single-axis birefringence.

FIGS. 2A to 2E are views illustrating the operation of a DHF-mode liquid crystal display device when treated as a single-axis birefringence medium. In FIGS. 2A and 2B, the axis of transmission of the polarizing plates joined to a pair of transparent substrates is shown as a heavy line for the upper polarizing plate and as a thin line for the lower polarizing plate. FIGS. 2C, 2D, and 2E each show sections of index ellipsoids corresponding to the polarity of the applied voltage. As shown in FIGS. 2A to 2E, a DHF-mode liquid crystal display device treated as a single-axis birefringence medium has single-axis birefringence with the axis in the direction of the helical axis when voltage is not applied. When voltage is applied, however, the liquid crystal display device gradually shifts from the helix arrangement of the liquid crystal orientation to a distorted helix structure, whereby a continuous gray-scale display is produced due to the altered birefringence and changed transmittance. This type of drive method is described in, for example, Japanese Patent Laid-open No. 194625/94 (JP, A, 6-194625).

As described in Y. Suzuki, et al., *Electronics* (Tokyo) Journal pp. 45–48, March 1994, a liquid crystal display device has also been proposed that switches between three stable states using an antiferroelectric liquid crystal having a chiral smectic Ca phase. FIGS. 3A to 3E show a liquid crystal display device of a prior art that performs switching between three stable states using this antiferroelectric liquid crystal. FIG. 3A is a schematic view, FIG. 3B is a schematic view of the operation as seen from the x-axis direction of FIG. 3A, FIG. 3C is a schematic view of the operation as seen from the positive y-axis direction of FIG. 3A, FIG. 3D is a schematic view of the operation as seen from the positive z-axis direction of FIG. 3A, and FIG. 3E shows the arrangement of the transmission axis of the polarizing plates as seen from the positive z-axis direction of FIG. 3A.

As shown in FIG. 3A, this display device has a construction in which an antiferroelectric liquid crystal is sealed between a pair of substrates 91 and 92, wherein liquid crystal molecules 96 and 97 each describe cones 94 as shown in the figure. When voltage is not applied, the liquid crystal orientation is stabilized by the antiferroelectric states in which adjacent layers are aligned such that spontaneous polarization is mutually canceled out. The arrangement of polarizing plates as shown in FIG. 3E in this state enables the display of black. As an electric field is applied, orientation changes according to whether the electric field is positive or negative as shown schematically in each of FIGS. 3B, 3C, and 3D, whereby transmittance increases. This display device basically involves switching between three stable states, but design of the applied pulses can produce a simulated gray-scale display, although not of absolutely continuous tones. In addition, this device is more shock resistant than devices produced from ferroelectric liquid crystal, and has the characteristic of restoring liquid crystal orientation by itself by means of an applied drive field. FIG. 4 shows the voltage-transmittance characteristic of a liquid crystal display device that performs switching between three stable states using this antiferroelectric liquid crystal when a triangular wave of a frequency of 0.01 Hz is applied. As shown in FIG. 4, the voltage-transmittance characteristic of this liquid crystal display device exhibits a hysteresis characteristic.

As described hereinabove, when a conventional liquid crystal display device that employs the DHF mode is put into actual use, the helical pitch employed must be short enough that the helix is not optically distinguishable, i.e., the helical pitch must be shorter than the wavelength of visible light that is within the range of use. Such an extremely short helical pitch, however, results in an increase in the voltage required for altering the helix structure, i.e., the threshold voltage. The drive voltage must therefore be increased when using the conventional liquid crystal display device that employs the DHF mode. In addition, because ferroelectric liquid crystal is used in cases in which the DHF effect is employed, after-image effects such as 'sticking' which are caused by spontaneous polarization will occur depending on the direction of spontaneous polarization in the phase boundary of the aligning film, just as in the case of a liquid crystal display device that uses SSFLC.

On the other hand, antiferroelectric liquid crystal display devices that employ three stable states are not capable of realizing absolutely continuous gray-scales, and in addition, cannot be used in combination with active matrix elements because their applied voltage is high, and moreover, because they have a hysteresis characteristic as shown in FIG. 4.

SUMMARY OF THE INVENTION

The object of the present invention is to provide a novel liquid crystal display device that enables continuous gray-scale display, that facilitates orientation of the liquid crystal, and moreover, that has a wide viewing angle and exceptional shock-resistance.

Another object of the present invention is to provide a novel liquid crystal display device that readily allows an active-matrix drive and that has a rapid response time.

The objects of the present invention can be achieved by a liquid crystal display device that comprises a pair of substrates and a liquid crystal material having an antiferroelectric phase sandwiched between the pair of substrates; wherein at least one of the pair of substrates undergoes an aligning process; and wherein the natural helical pitch of the liquid crystal material is smaller than the gap between the substrates. In the liquid crystal display device according to the present invention, the natural helical pitch of the liquid crystal material and is set to a value smaller than twice the lower-limit wavelength of the wavelength range of light used in the liquid crystal display device.

In other words, in the liquid crystal display device of the present invention, an antiferroelectric liquid crystal material having a natural helical pitch that is shorter than the spacing between the substrates, and moreover, that is shorter than twice the lower-limit wavelength of the wavelength range of the employed light, typically, the wavelength range of visible light, is injected within a liquid crystal cell formed from a pair of substrates. At least one of the substrates has undergone an aligning process. Here, the spacing of the substrates is also called 'cell gap'. Because the helical pitch is shorter than the cell gap, the helical axes of the helical structure of the liquid crystal are directed in a direction parallel with the substrate surfaces without the helices being constrained by surface stabilization. In addition, as will be clear from each of embodiments of the present invention described hereinbelow, the use of a liquid crystal material of antiferroelectric phase results in the formation of a double-helix structure within the liquid crystal layers. Due to this double-helix structure, the apparent pitch is just half the actual helical pitch in terms of optical interference. As a result, diffraction can be suppressed and a satisfactory display achieved if the apparent pitch is smaller than the lower-limit wavelength of the wavelength range of the light employed, i.e., if the actual helical pitch is smaller than twice the lower-limit wavelength of the wavelength range of the light employed. An extremely wide viewing angle can thus be obtained. In particular, diffraction can be reduced to a minimum by making the actual helical pitch smaller than the lower-limit wavelength of the wavelength range of light used.

The present invention allows the use of a substrate in which active elements such as thin-film transistors are arranged in matrix form, and in such case, it is preferable that the direction of the largest one of the field components parallel to the substrate surface substantially coincides with the direction of the helical axis in the liquid crystal material. If the horizontal field direction, which is the largest field direction on the same substrate, is made to substantially coincide with the helical axis of the helix structure of the liquid crystal, the liquid crystal orientation will not respond to the horizontal field, thereby reducing display defects.

According to the present invention, a liquid crystal material having an antiferroelectric phase can be used with a helical pitch that is shorter than twice the lower-limit wavelength of the wavelength range of the used light, meaning that the helical pitch can be made materially longer than in a conventional device using the ferroelectric liquid crystal. As a result, a liquid crystal display device can be operated with a lower applied voltage. This point is a key difference from a liquid crystal display device of DHF mode that uses a ferroelectric liquid crystal in which the liquid crystal that is used has a helical pitch that is shorter than the lower-limit wavelength of the wavelength range of the light used.

In an antiferroelectric phase, moreover, the liquid crystal molecules exhibit spontaneous polarization directed in mutually opposing directions, and as a result, there is virtually no occurrence of alignment of the direction of spontaneous polarization of liquid crystal molecules, in contrast with a ferroelectric liquid crystal in which the directions of spontaneous polarization are uniformly arranged in one direction. A liquid crystal display device of the present invention therefore does not generate such phenomena as 'sticking' which result from spontaneous polarization. Furthermore, in contrast with a liquid crystal display device that uses a ferroelectric liquid crystal, the liquid crystal display device of the present invention is extremely shock resistant because an antiferroelectric phase has a self-repair property of liquid crystal orientation. In addition, the liquid crystal display device of the present invention allows both analog tone (continuous gray-scale) display and a rapid response speed because the helix structure of a liquid crystal having a antiferroelectric phase can be easily varied in accordance with field intensity.

Due to the analog tone characteristics of the liquid crystal display device of the present invention as described hereinabove, an excellent switching characteristic and high-speed response characteristic can be obtained by combining the liquid crystal display device of the present invention with active elements such as thin-film transistors. In a case in which active-matrix drive is realized through combination with active elements, display can be achieved by taking advantage of the above-described effect even though the liquid crystal layer itself lacks a memory property. Finally, the liquid crystal display device of the present invention allows further improvements in the contrast and viewing angle characteristic because optical operation can be obtained that is equivalent to that of an optical single-axis medium within a surface that is parallel to the substrate surface.

The above and other objects, features, and advantages of the present invention will become apparent from the following description with references to the accompanying drawings which illustrate examples of the present invention.

BRIEF DESCRIPTION OF THE DRAWINGS

FIGS. 2A to 2E illustrate the operation of the conventional ferroelectric liquid crystal display device that uses the DHF mode;

FIG. 3A is a schematic view showing a conventional liquid crystal display device that performs switching between three stable states using an antiferroelectric liquid crystal;

FIG. 3B is a schematic view of the operation as seen from the x-axis direction of FIG. 3A;

FIG. 3C is a schematic view of the operation as seen from the y-axis direction of FIG. 3A;

FIG. 3D is a schematic view of the operation as seen from the z-axis direction of FIG. 3A;

FIG. 3E shows the arrangement of the transmission axes of the polarizing plates as seen from the front z-axis direction of FIG. 3A;

FIGS. 7A, 7B, and 7C illustrate the relation between the polarity of applied voltage, the state of birefringence, and the state of the helix structure in the liquid crystal layers of the liquid crystal cell shown in FIG. 5;

DESCRIPTION OF THE PREFERRED EMBODIMENTS

First Embodiment

Figure 5:
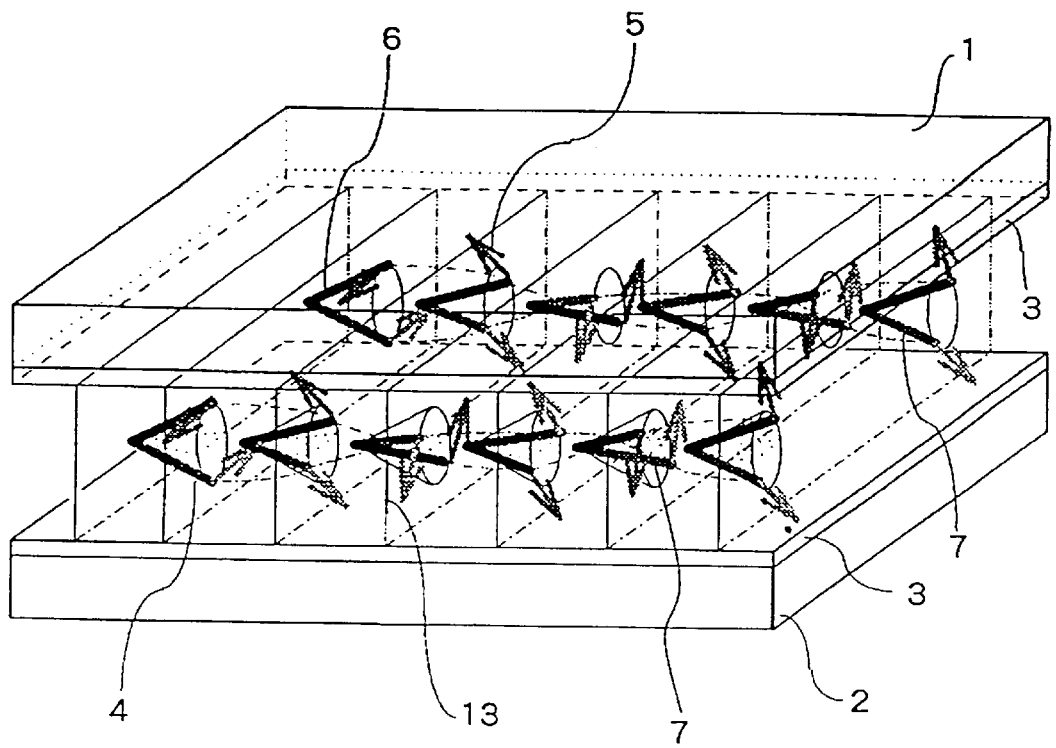
FIG. 5 is a perspective giving a schematic view of the first embodiment of the liquid crystal display device (liquid crystal cell) of the present invention.
Figure 6:
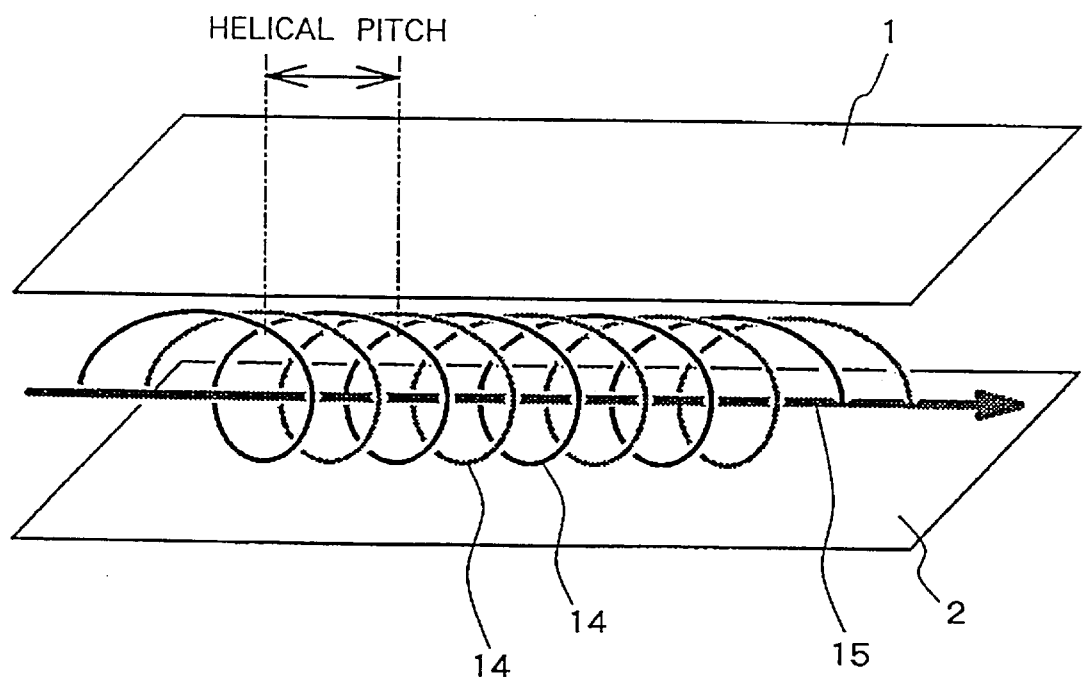
FIG. 6 is a schematic view of the helix structure described by a liquid crystal within the liquid crystal cell shown in FIG. 5.

In the liquid crystal display device (i.e., liquid crystal cell) of the first embodiment of the present invention shown in FIG. 5, liquid crystal layers made up of an antiferroelectric liquid crystal and having a helical structure are sealed between one pair of transparent substrates 1 and 2, and transparent electrodes 3 are formed on each of the opposing surfaces of substrates 1 and 2. In the helical structure of the antiferroelectric liquid crystal, the natural helical pitch is less than or equal to twice the lower-limit wavelength of the wavelength range of light used in this liquid crystal display device (typically, the wavelength range of visible light), and helical axis 15 (see FIG. 6) extends in a direction parallel to the substrate surface. Liquid crystal molecules 6 and 7 are arranged so as to form a layer structure 13. FIG. 6 presents a schematic view of only the state of the helical structure formed by these liquid crystal molecules by eliminating from the content of the figure the spontaneous polarization, liquid crystal molecules, and layer structure. Liquid crystal molecules for which spontaneous polarization is disposed in opposing directions each form a helix 14, and a double-helix structure is formed by shifting the phase of these molecules 180°.

Explanation is next presented regarding the operation of this liquid crystal display device. FIGS. 7A, 7B, and 7C show the relation between the state of the helical structure in the liquid crystal layers, the state of birefringence, and the polarity of applied voltage. These observations are taken from a direction perpendicular to the panel surface that is used as a liquid crystal display device. As shown in FIG. 7B, a double-helix structure that is free of distortion is formed when voltage is not applied, whereby the liquid crystal layer exhibits birefringence having an optical axis in the direction of the helical axis. In contrast, FIG. 7A shows the state when an electrical field directed toward the page surface is applied. The helices of the two directions that constitute a double-helix are both distorted in a direction toward below the page surface, and birefringence shifts in a direction from the upper left to the lower right as shown in the figure. On the other hand, FIG. 7C shows the state when an electrical field directed out from the page surface is applied. In contrast with the case shown in FIG. 7A, the two helices that constitute the double-helix are both distorted in a direction above the page surface, whereby the birefringence shifts in a direction from the lower left toward the upper right. In other words, the direction of rotation of the birefringence of the liquid crystal layers in this liquid crystal display cell differs according to whether a positive or negative field is applied.

Figure 8A:
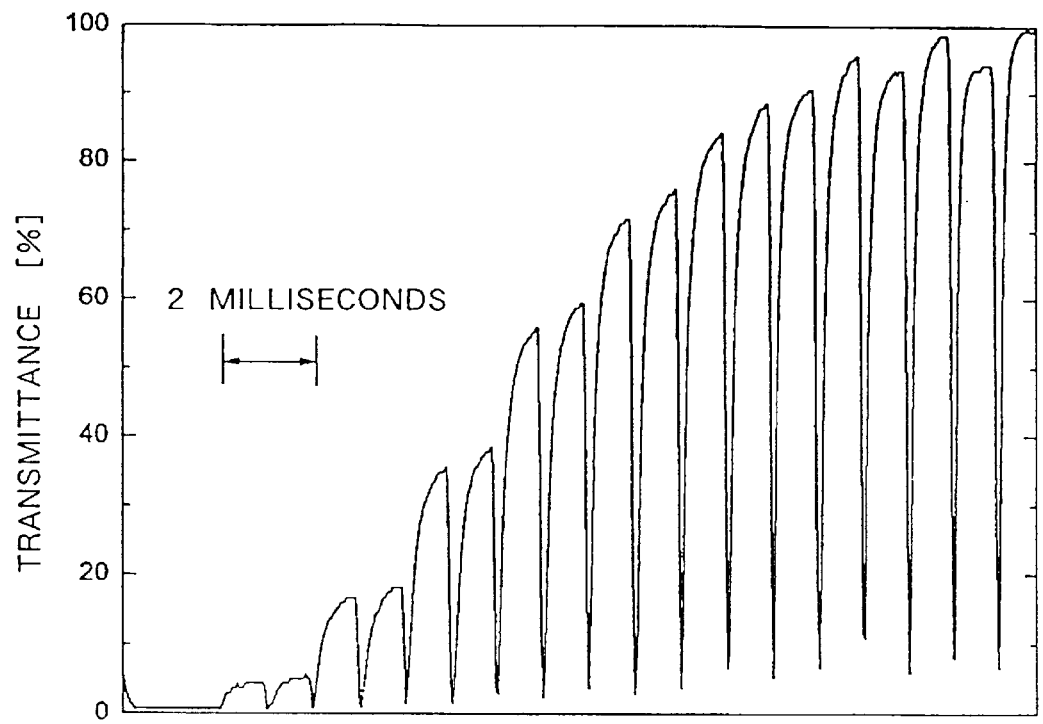
FIG. 8A is a graph showing the response waveform when a drive waveform for evaluation is applied to the liquid crystal cell of the first embodiment.
Figure 8B:
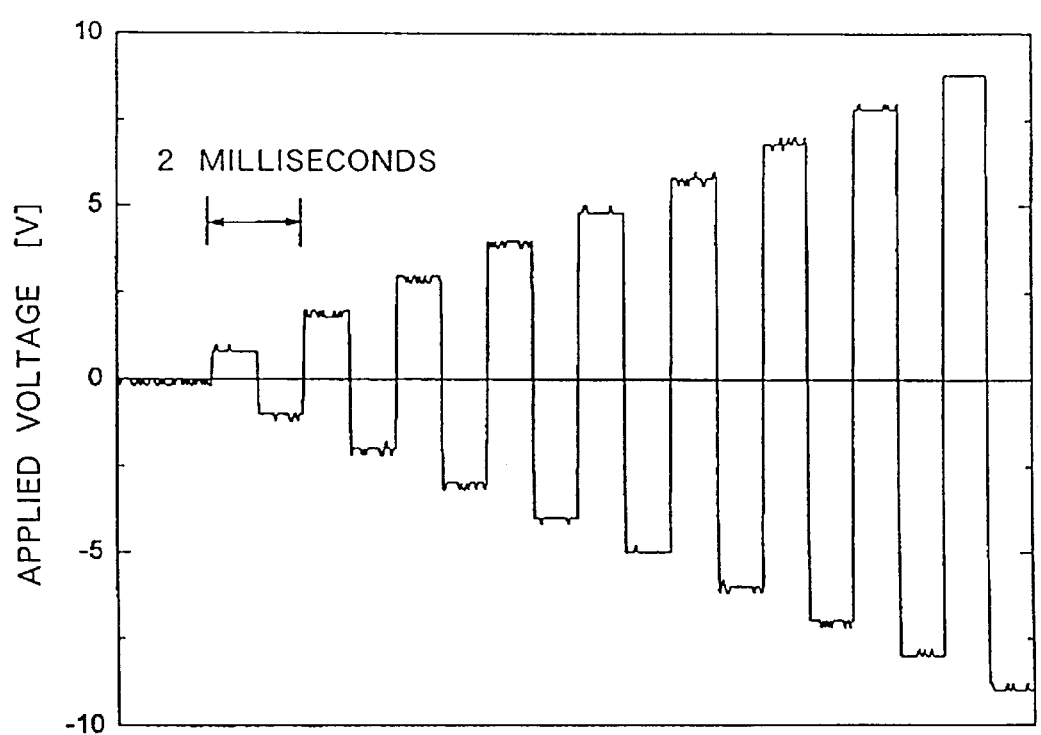
FIG. 8B is a graph showing the applied waveform corresponding to the response waveform shown in FIG. 8A.

Polarizing plates are joined to each of the pair of transparent substrates 1 and 2, and the axes of transmission (or the axes of absorption) of these two polarizing plates are arranged so as to be mutually orthogonal. Dark state can be achieved by making the -.optical axis of one of the polarizing plates match the direction of the optical axis of the liquid crystal layer when an electric field is not applied, and bright state can be achieved by applying an electric field in this arrangement. In such a white display state, the amount of transmitted light can be continuously varied according to the intensity of the field in field regions that are weaker than a field that completely unwinds the helices. In other words, continuous tone variations can be achieved in this liquid crystal display cell by varying the applied voltage. FIGS. 8A and 8B are prepared to illustrate examples of the relation between drive voltage and transmittance. Transmittance changes as shown in FIG. 8A when a rectangular wave is applied that changes as shown in FIG. 8B, i.e., when a rectangular wave is applied having a peak voltage that gradually increases with repetition.

Second Embodiment

A liquid crystal display device in which the natural helical pitch of the liquid crystal material in the first embodiment is equal to or lower than the lower-limit wavelength of the wavelength range of light employed is shown as the second embodiment. In this second embodiment, the helical pitch is equal to or less than the lower-limit wavelength of the wavelength range of the light employed, and due to the formation of a double-helix having this type of helical pitch, the same effects can be obtained as for a conventional liquid crystal display device using a DHF mode in which the helical pitch adopted is equal to or less than half the wavelength range of visible light. As a result, deterioration of optical characteristics due to diffraction can be eliminated, and excellent characteristics can be obtained in a liquid crystal display device that employs an antiferroelectric liquid crystal.

Third Embodiment

Figure 9:
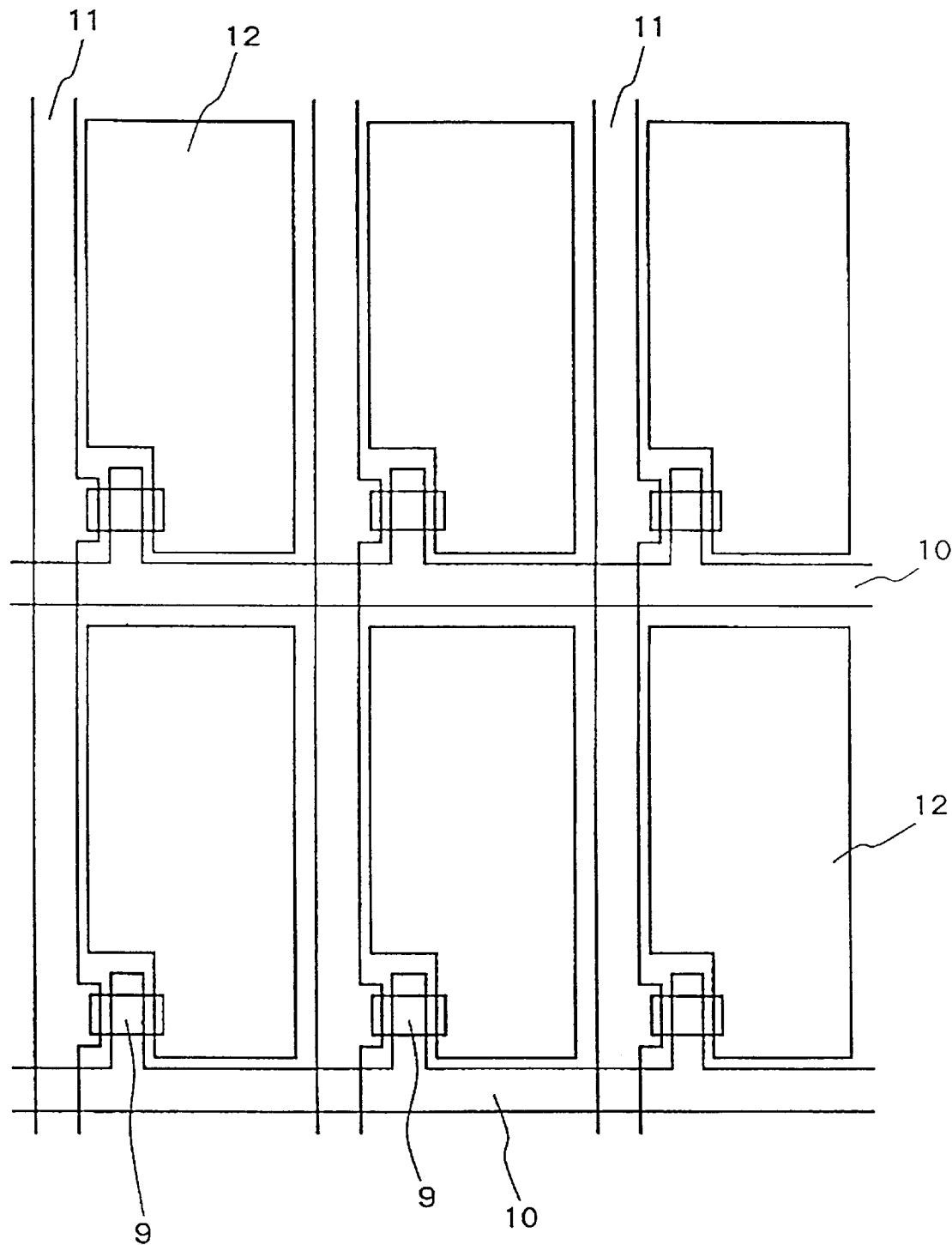
FIG. 9 is a plan view illustrating the TFT substrate of the liquid crystal display device of the third embodiment of the present invention.

In the third embodiment, a liquid crystal display device is described that has a structure in which an active-matrix drive is realized through combination with a TFT (thin-film transistor) substrate. Here, one of the two transparent substrates 1 and 2 in the liquid crystal display device of the first embodiment shown in FIGS. 5 and 6 is made a TFT substrate and the other is made an opposing substrate. As shown in FIG. 9, at least one pixel electrode 12 corresponding to each pixel (picture element) is formed on the TFT substrate, and to individually drive each pixel, the TFT substrate is further provided with a plurality of gate bus lines 10 extending in the left-right direction of the figure, drain bus lines 11 extending in the up-down direction of the figure, and a thin-film transistor (TFT) 9 is arranged at each point of intersection between gate bus lines 10 and drain bus line 11. The gates and drains of thin-film transistors 9 are each connected to a corresponding gate bus line 10 and drain bus line 11, and in addition, the sources of thin-film transistors 9 are each connected to a corresponding pixel electrode 12. An opposing electrode (common electrode) common to each of pixel electrodes 12 is formed on the opposing substrate.

The interior of the liquid crystal display device (liquid crystal panel) of the third embodiment is monostabilized with the direction of the normal lines of each of the layers of the layered structure 13 of antiferroelectric liquid crystal (FIG. 5) being aligned in a substantially uniform direction, and moreover, the projection components of liquid crystal molecules 6 and 7 toward the substrate surface also aligned in another substantially uniform direction.

Explanation is next presented regarding the operation of the liquid crystal display device of the third embodiment. A waveform in which a drive signal of a prescribed frequency is divided by the number of gate lines is applied to each of drain bus lines 11 corresponding to each of gate bus lines 10. The prescribed frequency is normally 30 Hz, but may be made a frequency such as 60 Hz when flicker is taken into consideration, or may be made a lower frequency when the response of the liquid crystal is slow. A waveform that causes thin-film transistor 9 to become an ON-state is applied to each of gate bus lines 10 when that particular line is selected, whereby the waveform of drive bus line 11 is applied to the liquid crystal layer of every pixel by means of pixel electrode 12. The voltage of the liquid crystal portion of the relevant pixel is then held until gate bus line 10 is again selected. The liquid crystal is thus capable of a display-holding operation even though it lacks a memory property. In addition, as explained in the first embodiment, because analog tone display is made possible by the aligning structure of the liquid crystal used here, gray-scale display is achieved by making each brightness level correspond to a voltage waveform applied to drain bus line 11.

Fourth Embodiment

Figure 10A:
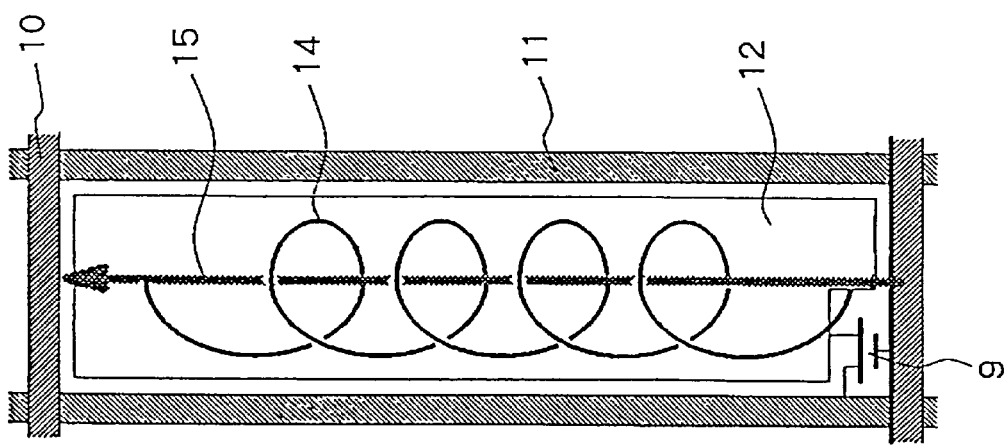
FIG. 10A shows, by means of the arrangement of the helical structure, the relation between the liquid crystal orientation in the liquid crystal display device of the fourth embodiment of the present invention and a pixel structure that uses thin-film transistors.
Figure 10B:
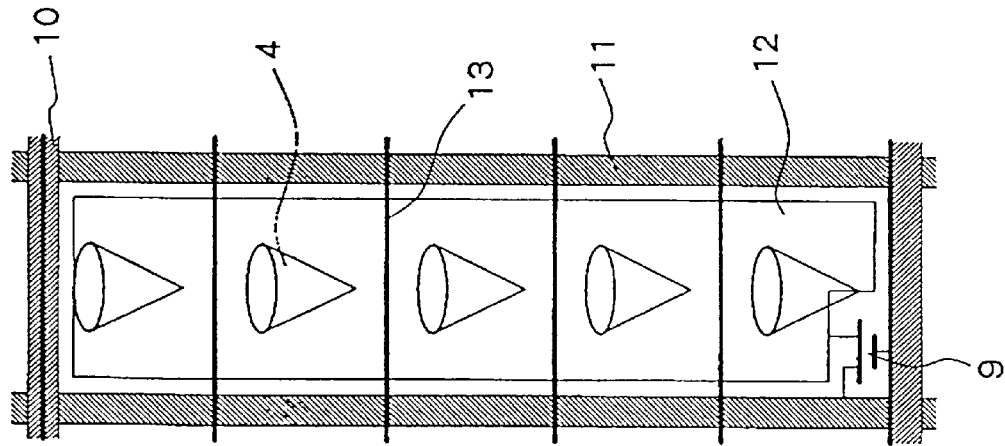
FIG. 10B shows, by means of the arrangement of the liquid crystal layer structure and cones described by the liquid crystal, the relation between the liquid crystal orientation in the liquid crystal display device of the fourth embodiment of the present invention and a pixel structure that uses thin-film transistors.

As the fourth embodiment of the present invention, a liquid crystal display device is described that uses an active element substrate that is similar to the TFT substrate used in the third embodiment, and moreover, that has a structure in which the direction of the helical axes substantially matches the direction that experiences the maximum effect of the field parallel to the support substrate surface. FIGS. 10A and 10B show the relation between the liquid crystal orientation and the pixel structure that uses thin-film transistors (active elements) in the liquid crystal display device of this fourth embodiment, FIG. 10A specifically showing the arrangement of helical structure, and FIG. 10B showing the arrangement of liquid crystal layered structure 13 and cones described by the liquid crystals for a pixel structure. In this liquid crystal display device, the maximum potential difference forms in the direction that joins gate bus line 10 and pixel electrode 12, and as can be seen from FIG. 10A, the direction of this maximum potential difference substantially coincides with helical axis 15 of helix 14 described by the liquid crystal.

Figure 11:
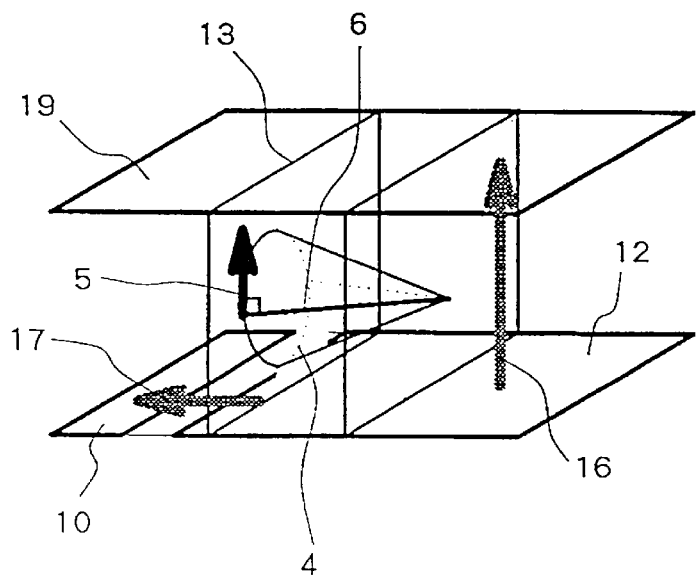
FIG. 11 is a perspective showing the operation of the liquid crystal display device of the fourth embodiment.

Explanation is next presented regarding the operation of this liquid crystal display device. FIG. 11 illustrates the operation of the liquid crystal display device and shows the relation between the field applied to the liquid crystal layer and a liquid crystal molecule 6. One of the substrates is an active-element substrate that has gate bus line 10 and pixel electrode 12, the other substrate is an opposing substrate that has opposing electrode 19, and the large vertical arrow in the figure indicates field 16 between this pair of substrates. The spontaneous polarization direction 5 of liquid crystal molecule 6 can be considered to be substantially parallel to field 16 between these substrates. On the other hand, field 17 in a horizontal direction forms between pixel electrode 12 and gate bus line 10 on the active element substrate, and the direction of this horizontal field 17 is perpendicular to spontaneous polarization direction 5 of liquid crystal molecule 6. As a result, liquid crystal molecule 6 receives almost no influence from horizontal field 17 in this liquid crystal display device. A considerable amount of energy is required for the liquid crystal orientation to move and deform layer structure 13, and in this embodiment, the direction of horizontal field 17 is perpendicular to the surface that is formed by layer structure 13, and deformation of layer structure 13 is therefore unlikely to occur. As a result, display defects tend not to occur in this liquid crystal display device.

EXAMPLES

The present invention is illustrated in further detail through the following examples.

Example 1

This example is based on the above-described first embodiment. A liquid crystal display device (liquid crystal cell) of the structure shown in FIG. 5 was produced. Transparent glass was used to produce the pair of transparent substrates 1 and 2, and transparent electrodes 3 were patterned on these substrates 1 and 2 using ITO (indium-tin-oxide). Here, patterning was formed such that round areas 9 mm in diameter overlaid transparent electrodes 3 of the opposing substrates. Next, a soluble polyimide was applied by means of a spin-coating method, following which a polyimide layer was formed by baking. This polyimide layer was subjected to two rubbing processes in a single direction by buff pad using nylon to produce an aligning film. The thickness of the aligning film as measured by a contact step gauge was approximately 60 nm, and the pretilt angle as measured by a crystal rotation method was 1.2°.

Spherical spacers (Micropearls) approximately 2 μm in diameter were scattered on one of the pair of these glass substrates 1 and 2, and a thermosetting sealant into which were dispersed cylindrical glass rod spacers approximately 2 μm in diameter was applied to the other substrate. These substrates 1 and 2 were arranged such that the direction of the rubbing process in each substrate was parallel to the other, and moreover, such that the position of transparent electrode 3 of each corresponded to the other, following which the sealant was set by a heat treatment, thereby completing assembly of a liquid crystal cell, which was a 2-μm gap.

Figure 12:
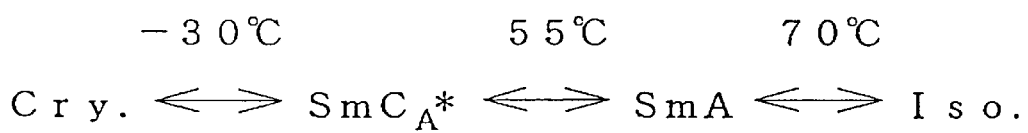
FIG. 12 shows the phase transition temperatures of the liquid crystal material used in Examples 1 and 5.

Next, an antiferroelectric liquid crystal that exhibited a phase transition behavior and having a $SmC_A^*$ phase as shown in FIG. 12 was injected into this liquid crystal cell at 80° C. in an isotropic phase state in a vacuum, and slowly cooled to room temperature at the rate of 0.1° C./min. In FIG. 12, 'cry.' indicates a crystalline phase and 'SmA' indicates a smectic A phase. The natural helical pitch of this liquid crystal material was 0.8 μm, the spontaneous polarization was 140 $nC/cm^2$ (25° C.), and the tilt angle was 30°. This liquid crystal cell was intended for use with visible light (generally, of a wavelength of 390–770 nm), and a color filter (not shown) provided on either one of the substrates restricts the lower-limit wavelength of light passing through the liquid crystal cell to no less than 420–440 nm. The lower limit of the wavelength range of light used in this liquid crystal cell was also accordingly set to no less than 420–440 nm, and the above-described helical pitch was fixed to within a range of twice the lower-limit wavelength of the wavelength range of the light used.

Observation by a polarizing microscope of a liquid crystal cell produced according to the foregoing description revealed a consistent optical single-axis orientation. In addition, in birefringence measurement, the optical axis substantially matched the direction of the rubbing process, and it could therefore be presumed that the helical axis was directed in the direction of the rubbing process.

Figure 1:
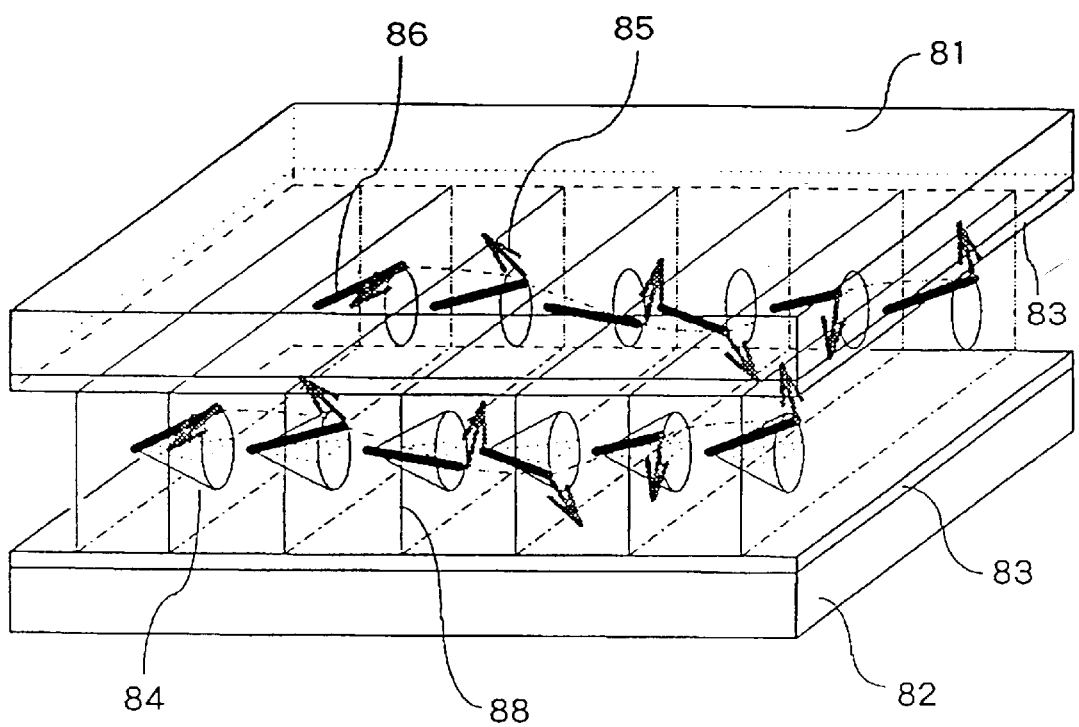
FIG. 1 is a perspective showing a schematic view of the structure of a conventional ferroelectric liquid crystal display device that uses the DHF mode.
Figure 4:
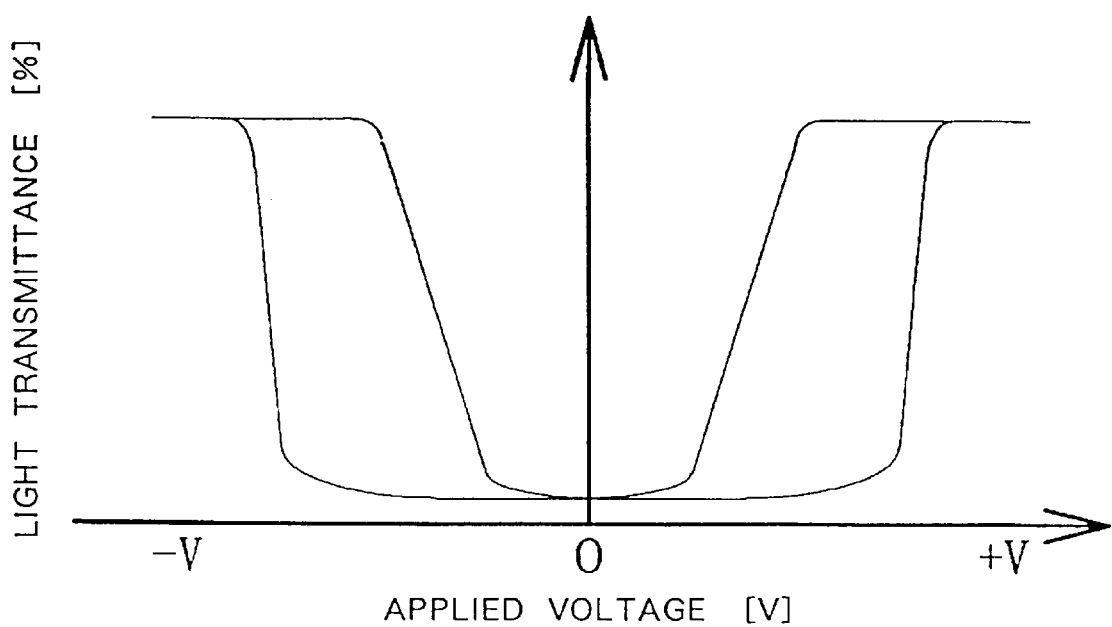
FIG. 4 is a graph showing the transmittance characteristic with respect to voltage when a triangular wave of a frequency of 0.01 Hz is applied to a conventional liquid crystal display device that performs switching between three stable states using an antiferroelectric liquid crystal.
Figures 13, 14:
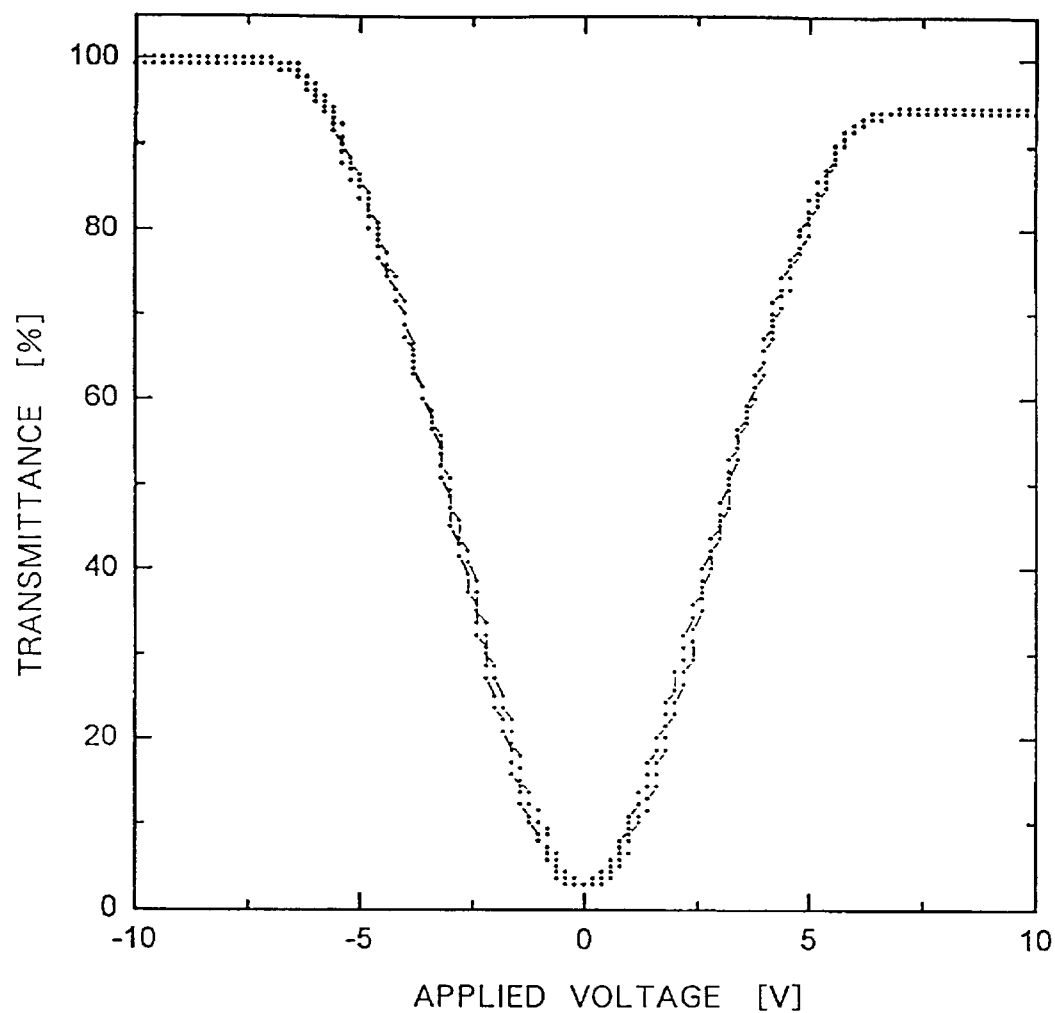
FIG. 13 is a graph showing the transmittance characteristic with respect to voltage when a triangular wave of a frequency of 0.01 Hz is applied to the liquid crystal display device of Example 1.
FIG. 14 shows the phase transition temperatures of a liquid crystal material used in Example 2.

In order to observe the hysteresis characteristic of this liquid crystal cell, a triangular wave of a frequency of 0.01 Hz was applied and the voltage-transmittance characteristic was measured. FIG. 13 shows the results of measuring the transmittance characteristic with respect to voltage. As is clear from a comparison with the voltage-transmittance characteristic of a conventional ferroelectric liquid crystal display device using the DHF mode shown in FIG. 4, the liquid crystal cell of this first embodiment exhibits virtually no hysteresis characteristic and, in addition, responds at a far lower voltage. The voltage applied to a conventional DHF-mode cell that used ferroelectric liquid crystal is far higher at 30 V under the same cell conditions as the present embodiment, and it can further be seen that the liquid crystal cell of this embodiment responds at a far lower voltage than the DHF-mode cell. In addition, the liquid crystal cell of this embodiment features a marked reduction of hysteresis compared to a DHF-mode cell. The reason for this reduction of hysteresis is not clear, but it is believed that an antiferroelectric liquid crystal contains liquid crystals having spontaneous polarization in opposite directions which produce pairs, thereby providing a complementary improvement in characteristic. In contrast, a bias in characteristic is produced in a ferroelectric liquid crystal because spontaneous polarization aligns in a single direction and in only one polarization direction. Due to this low voltage and analog tone characteristic that is virtually free from hysteresis, it can be seen that the liquid crystal display device of this embodiment can be easily combined with active elements such as thin-film transistors.

Example 2

This example corresponds to the above-described second embodiment. The liquid crystal was produced by the same processes as in Example 1, but the liquid crystal material and aligning film were modified. The employed liquid crystal material was an antiferroelectric liquid crystal having the phase transition behavior shown in FIG. 14, a $SmC_A^*$ phase, and in which the helical pitch was 0.33 μm. spontaneous polarization was 100 $nC/cm^2$ (25° C.), and the tilt angle was 33°. In FIG. 14, 'cry.' indicates a crystalline phase; '$SmC_A^*$' indicates an antiferroelectric phase, which is a smectic A phase; 'N*' indicates a nematic phase; and 'Iso.' indicates an isotropic phase. In addition, the aligning film used had a thickness of approximately 50 nm as measured by a contact step gauge, and the pretilt was 0.6° as measured by a crystal rotation method. Clearly, a helical pitch of 0.33 μm is shorter than the wavelength of any light component of visible light, and this helical pitch satisfies the condition that helical pitch should be shorter than the lower-limit wavelength of the wavelength range of the light used. Furthermore, the transparent electrodes were produced as circles 9 mm in diameter as in the case described hereinabove, and had an electrode area of approximately 68 $mm^2$.

In contrast with the above-described Example 1 in which a formation of thin stripes was observed, observation of the fabricated liquid crystal cell of this Example 2 by a polarizing microscope revealed an extremely good display having absolutely no stripe formation in the liquid crystal cell. These excellent results were obtained because the helical pitch of a liquid crystal in which double-helices are formed is shorter than the wavelength of any light component of visible light, and the effective helical pitch is actually shorter than half the wavelength of any light component of visible light.

Next, the response speed of this liquid crystal cell was measured. The response time was determined as the time required to change to a transmittance of 90%, where 100% is the difference from transmittance $T_A$ during which voltage A was applied continuously to transmittance $T_B$ during which voltage B was applied continuously, when the applied voltage was changed from voltage A to a different voltage B.

An extremely rapid response speed was recorded, the switching time when the applied voltage was changed from 0 V to ±10 V being 70–1000 microseconds at response time $\tau_{ON}$ when voltage was applied, and 100–300 microseconds at response speed $\tau_{OFF}$ from a voltage applied state to an OFF state (0 V).

Example 3
Investigation of rubbing conditions

In Examples 1 and 2, the rubbing directions were made parallel, but in Example 3, an antiparallel arrangement was tested. Liquid crystal cells manufactured with both parallel and antiparallel rubbing arrangements exhibited similar characteristics, but the maximum transmittance for a cell with an antiparallel rubbing arrangement was lower. Nevertheless, when the liquid crystal material was changed, cells with antiparallel rubbing sometimes had the higher maximum transmittance.

Example 4

Example 4 tested the possibility of obtaining a liquid crystal cell with higher contrast by more precisely adjusting the rubbing angle.

A liquid crystal cell was produced in which only the surface of only one substrate was rubbed, and the discrepancy between the rubbing direction and the direction of liquid crystal orientation was measured. From the results it was seen that in the combination of liquid crystal material and aligning film used in Example 2, the rubbing direction diverged from the liquid crystal orientation by 3°.

An experiment was conducted to align the liquid crystal orientation in an average direction of the rubbing direction in the liquid crystal cell of Example 2 by making the rubbing directions in the upper and lower substrates diverge by 6°. A 6°-cross-rubbing liquid crystal cell that approximated a parallel structure in which the rubbing direction was shifted by 6° and a 174°-cross-rubbing liquid crystal cell that approximated an antiparallel structure in which the rubbing direction was shifted 174° were produced. As a result, perpendicular lines of each layer of the layer structure in the 6°-cross-rubbing liquid crystal cell completely aligned with the average rubbing direction, and an extremely high-contrast cell was obtained having a contrast ratio of 235. In addition, the maximum transmittance of this cell was approximately 30% higher than the maximum transmittance of the parallel rubbing cell. From these results, it was learned that a high-contrast and bright liquid crystal display device can be obtained.

The optimum values for these rubbing conditions varied according to the combination of the liquid crystal material and aligning film. It was also found that results are dependent on the rubbing conditions (type of buff pad, degree of contact, speed of stage movement, rpm, number of rotations, etc.) adopted in the rubbing process.

Figure 15A:
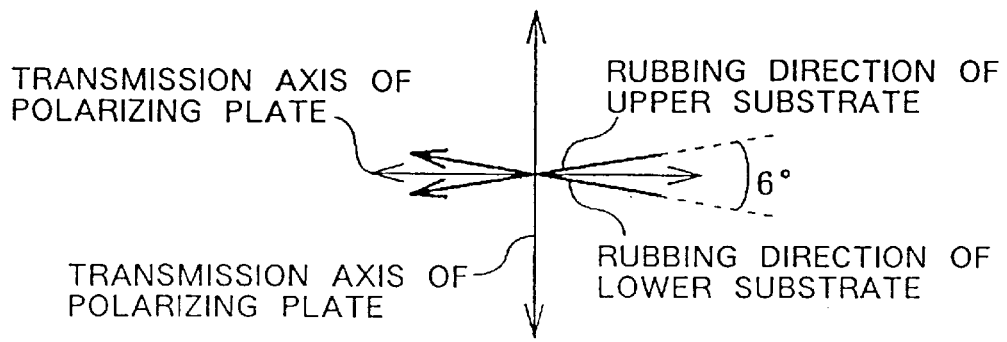
FIG. 15A shows the direction of cell rubbing and the arrangement of the polarizing plates when voltage is not applied to the liquid crystal display device of Example 4 during measurement of the viewing angle characteristic.
Figure 15B:
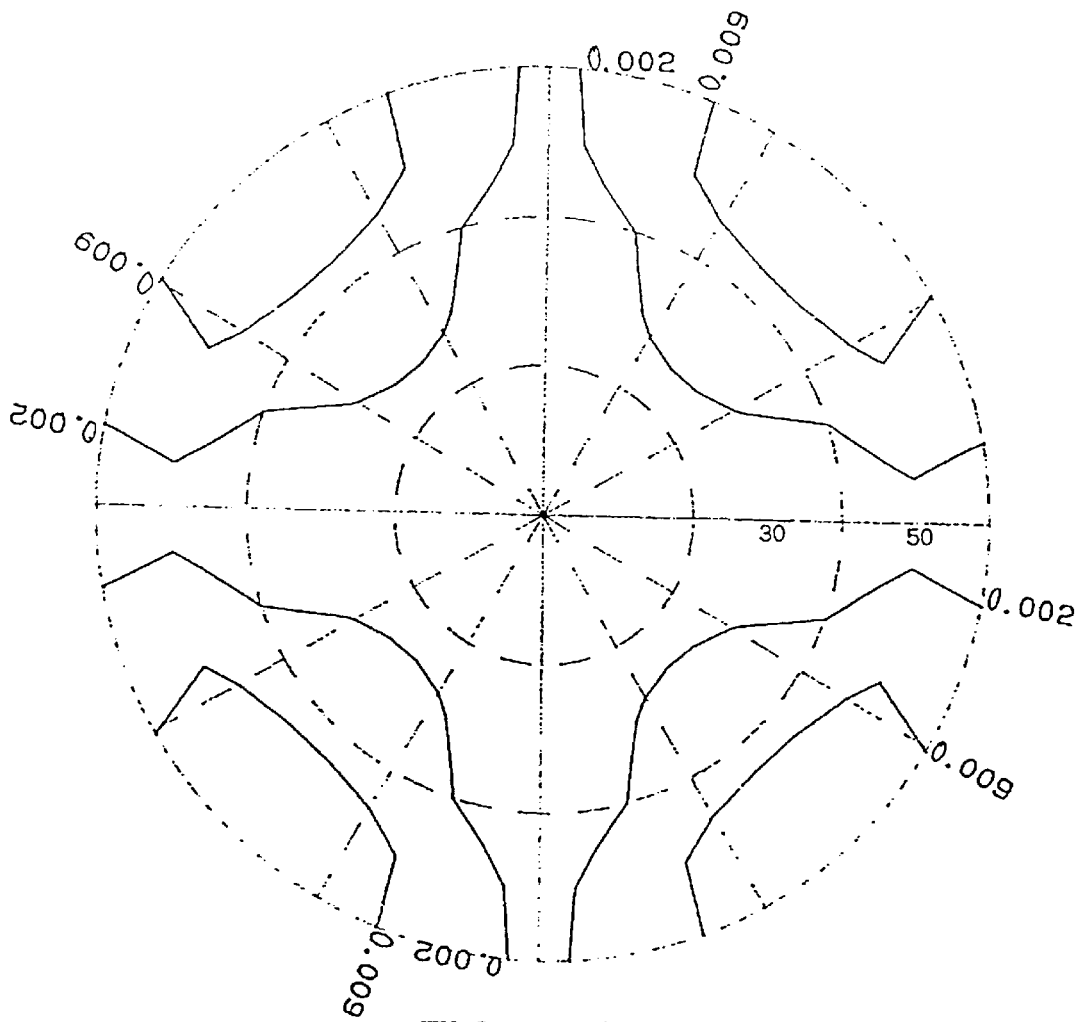
FIG. 15B shows the viewing angle characteristic measured when voltage is not applied to the liquid crystal display device of Example 4.

The viewing angle characteristic of this liquid crystal cell was next measured. Here, an 'EZ contrast' produced by the French company ELDIM was used in measuring the field of view characteristic. This apparatus makes use of Fourier optics and a cooling CCD (charge coupled device) and measures at one time the viewing angle characteristics for all bearings up to a zenith angle of 60° corresponding to a conoscope image obtained by a polarizing microscope. FIGS. 15A and 15B show the results of measuring the viewing angle characteristics of the liquid crystal cell of Example 4 when voltage is not applied. FIG. 15A shows the arrangement of the polarizing plates and direction of rubbing, and FIG. 15B shows the measured viewing angle characteristics. In FIG. 15B, the measured luminance was converted to a value which takes as 100% the transmittance at the front surface when ±8 V is applied. FIG. 15B shows an equivalent transmittance curve as the viewing angle changes to the zenith angle and azimuth direction, the perpendicular direction of the liquid crystal cell being taken as center. The transmittance on a curve is shown in the vicinity of each curve. As can be seen from the figure, substantially symmetrical and satisfactory characteristics can be obtained in nearly all directions with this liquid crystal cell.

Example 5

This example corresponds to the third embodiment (see FIG. 9). Here, 480 gate bus lines 10 and 640 drain bus lines 11 were formed on a TFT substrate from chrome (Cr) by a sputtering method. The width of these lines was 10 μm. Silicon nitride ($SiN_x$) was used in the gate insulation film of the TFT (thin-film transistors) 9. The size of a single pixel was 330 μm vertically and 110 μm horizontally, TFT 9 were formed using amorphous silicon, and pixel electrodes 12 were formed by a sputtering method using indium-tin-oxide (ITO), a transparent electrode material. An array of thin-film transistors thus formed on a glass substrate was used as the TFT substrate. The opposing substrate that confronts this TFT substrate employed a glass substrate on which a light-shield film was formed using chrome, following which a transparent electrode was formed as a common electrode using ITO. A color filter was then formed in a matrix configuration using a dyeing method, after which a protective layer was provided over this surface using silica. Next, polyamic acid was applied using a spin-coat process, and the substrate was baked at 200° C. to convert to imide, thereby producing a polyimide film. This polyimide film was treated by a rubbing process in which a buffing pad using nylon was wound around a roller 50 mm in diameter, the rotation speed of the roller was 600 rpm, the speed of stage movement was 40 mm/sec, the amount of pressure was 0.7 mm, and rubbing was in a direction such that 10°-cross-rubbing was produced in two rubbing processes. The thickness of the aligning film was approximately 50 nm as measured by a contact step gauge, and the pretilt angle was 1.5° as measured by a crystal rotation method.

Micropearls, which are spherical spacers approximately 2 μm in diameter, were scattered on one of the pair of glass substrates (TFT substrate and opposing substrate), and a thermosetting sealant in which rod spacers made of cylindrical glass approximately 2 μm in diameter are dispersed was applied on the other substrate. These substrates were then arranged opposed to each other such that the direction of the rubbing process for each resulted in mutual 10°-cross rubbing, and then subjected to a heat treatment to harden the sealant and produce an assembled panel with a 2-μm gap.

An antiferroelectric liquid crystal exhibiting a phase transition behavior such as shown in FIG. 12 and having an $SmC_A^*$ phase was then injected into this panel in an isotropic phase (Iso) state at 80° C. in a vacuum. With the liquid crystal still at 80° C., a rectangular wave having a frequency of 3 kHz and an amplitude of ±10 V was then applied to the entire panel surface using a wave signal generator and a high-output amplifier, and the panel was gradually cooled while applying the field to room temperature at a cooling rate of 0.1° C./min. As in the results shown for Example 4 in FIG. 15, an extremely broad viewing angle characteristic was obtained by a liquid crystal panel produced in this way when voltage was not applied.

Figure 16:
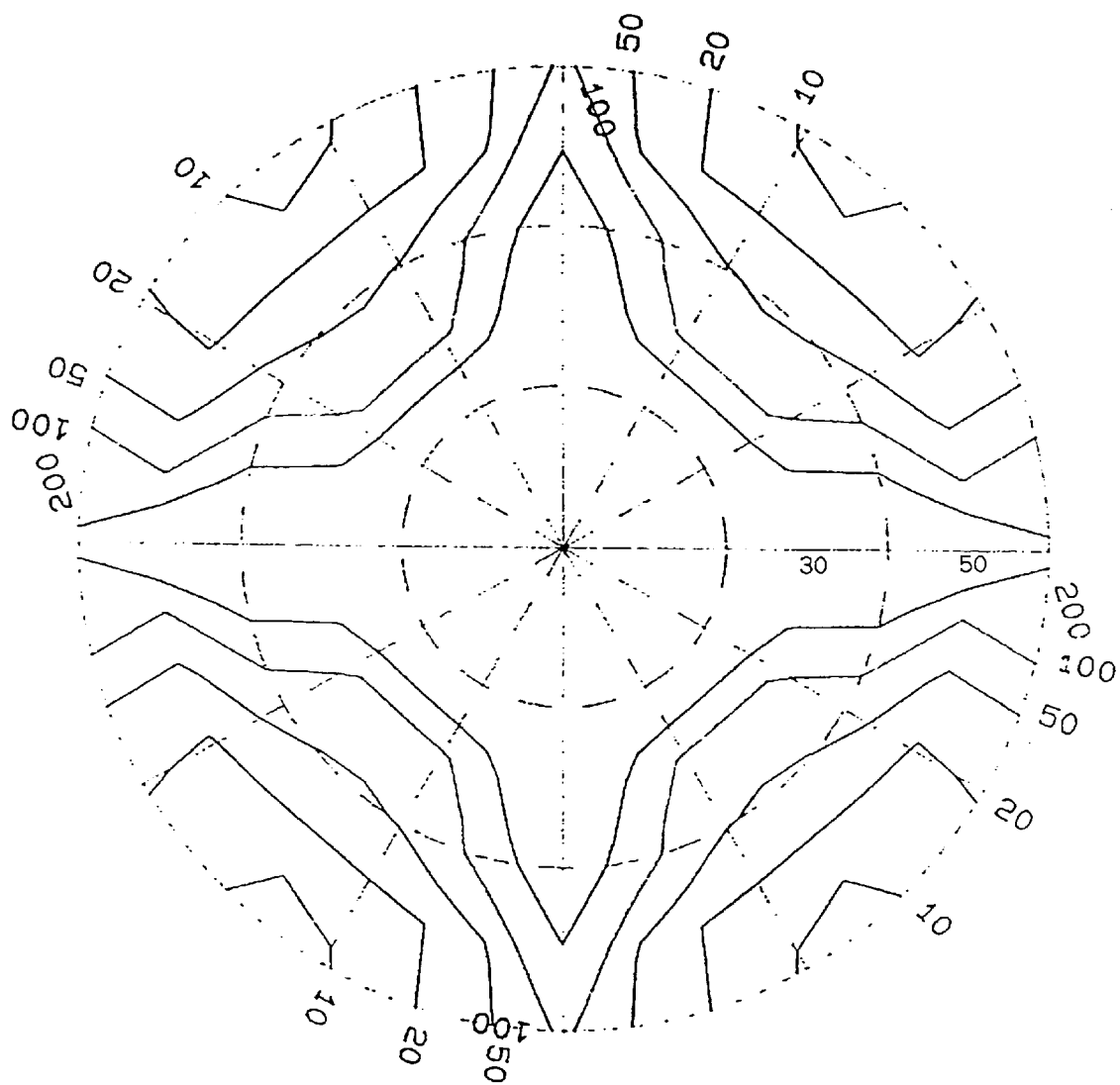
FIG. 16 shows the results of measuring the viewing angle characteristic of the contrast ratio between bright and dark states in the liquid crystal display device of Example 5.

FIG. 16 shows the results of measuring the viewing angle characteristics of the contrast ratio between bright state and dark state in this liquid crystal panel. As shown in FIG. 15, the viewing angle characteristic is broad when voltage is not applied, from which it can be understood that the viewing angle characteristic of the contrast ratio is also broad. Because the selection time interval of a TFT gate was not long enough in this example, a maximum voltage of ±11 V, i.e., a voltage of approximately 1.5 times the saturation voltage of 7 V at a frequency of 0.01 Hz, was required in the amplitude voltage of the voltage waveform applied to the drain.

Example 6

This is another example corresponding to the above-described third embodiment. In this Example 6, a liquid crystal panel was produced as in Example 5, but this example differs from Example 5 in that (i) a storage capacity was provided in the gate storage structure, and (ii) the aligning film on the TFT substrate side was changed.

The storage capacity of the gate storage structure was formed for each pixel electrode 12 by extending one portion of that pixel electrode 12 and overlaying, not the gate bus line 10 that selected that pixel electrode 12 but rather, the adjacent gate bus line 10, with an interposed insulation film. This storage capacity has the role of increasing the capacity of the holding capacity portion by adding capacity arranged in parallel rows with respect to the capacity of the liquid crystal portion, storing sufficient charge in the holding capacity portion during the time that the gate of TFT 9 is selected, and supplying charge to the capacity of the liquid crystal portion when the gate is non-selected and TFT 9 enters a hold operation. Although the liquid crystal orientation may not change sufficiently during the interval of selection, the liquid crystal orientation changes at the onset of the interval of non-selection if this supplied charge is great. At this point, the storage capacity is preferably large. In this example, a gate storage structure was used, but to ensure capacity, the storage capacity may also be formed by providing hold capacity lines and hold capacity electrodes, or gate storage may be combined with another hold capacity structure.

As the aligning film on the TFT substrate side, an aligning film of lowered viscosity and reduced solid component as compared with the case of Example 5 was applied over pixel electrode 12 formed from ITO. The object of this modification of the aligning film is to increase capacity by means of an aligning film that is connected in series to the capacity of the liquid crystal portion, and to facilitate write operations. In a case in which an aligning film is applied over pixel electrode 12, capacity is formed that is serially connected to the aligning film. In most cases, the thickness of this aligning film is smaller than the cell gap of the liquid crystal portion, and the capacity of the aligning film is greater. Here, reducing the thickness of the aligning film reduces the thickness of capacity that was serially connected and increased the combined capacity.

The adoption of a storage capacity and the modification of the aligning film have the object of reducing the amplitude voltage applied to the liquid crystal cell. Taking these two steps allowed a reduction of the amplitude voltage of the waveform applied to the drain of TFT 9 to a maximum of ±4 V, which was about 36% the level of Example 5. This amplitude voltage can be reduced to a still lower level by designing the capacity values. The liquid crystal panel of this example achieves an excellent display and eliminates phenomena such as sticking. These results are believed to result from the fact that spontaneous polarization does not align in a single direction, in contrast with a monostabilized liquid crystal display device using SSFLC or ferroelectric liquid crystal.

Example 7

This example corresponds to the fourth embodiment. The TFT substrate was produced in the same way as in Example 5, and each substrate was subjected to 6°-cross rubbing such that the liquid crystal orientation was arranged as shown in Figs. 10A and 10B. The occurrence of sticking or other display defects in the liquid crystal panel of this example was even less than in the liquid crystal panels of Example 5 or Example 6. In addition, there was no occurrence of display defects caused by disruption in the orientation due to long periods of use.

In each of the above-described examples, a color filter was formed on a substrate (opposing substrate) arranged opposite a TFT substrate on which TFT were formed. However, the color filter may also be formed on the TFT substrate instead of the opposing substrate. Alternatively, a color filter need not be formed at all, or the formation of a color filter may be elected according to the pixels. In each of the examples, moreover, refractive index anisotropy and liquid crystal cell thickness were selected such that the display of black and white tends not to exhibit any dependence on wavelength, but the liquid crystal cell gap may also be set to a thinner or thicker dimension for the purpose of using an interference color, or for an overall design purpose that includes, for example, the polarizing plates and light source.

While preferred embodiment of the present invention have been described using specific terms, such description is for illustrative purposes only, and it is to be understood that changes and variations may be made without departing from the spirit or scope of the following claims.

What is claimed is:

1. A liquid crystal display device comprising a pair of substrates; and
   a liquid crystal material having an antiferroelectric phase sandwiched between said pair of substrates; wherein
   at least one of said pair of substrates undergoes an aligning process, and a natural helical pitch of said liquid crystal material is smaller than a gap between the substrates;
   wherein the natural helical pitch of said liquid crystal material is smaller than twice a lower-limit wavelength of a wavelength range of light used in said liquid crystal display device.

2. The liquid crystal display device according to claim 1, wherein the natural helical pitch of said liquid crystal material is smaller than twice a lower-limit wavelength of a wavelength range of light used in said liquid crystal display device, said wavelength range of used light being a wavelength range of visible light.

3. The liquid crystal display device according to claim 1, wherein the natural helical pitch of said liquid crystal material is smaller than a lower-limit wavelength of a wavelength range of light used in said liquid crystal display device.

4. The liquid crystal display device according to claim 3 wherein active elements are formed on at least one of said pair of substrates.

5. The liquid crystal display device according to claim 4 wherein said active elements are thin-film transistors; pixels are arranged in matrix form; and a pixel electrode and said thin-film transistor are provided for each region corresponding to each of said pixels.

6. The liquid crystal display device according to claim 5 wherein a direction of a maximum field component among field components parallel to said substrate surface substantially coincides with a direction of a helical axis in said liquid crystal material.

7. The liquid crystal display device according to claim 1, wherein the natural helical pitch of said liquid crystal material is smaller than a lower-limit wavelength of a wavelength range of light used in said liquid crystal display device, said wavelength range of used light being a wavelength range of visible light.

8. The liquid crystal display device according to claim 1 wherein active elements are formed on at least one of said pair of substrates.

9. The liquid crystal display device according to claim 8 wherein said active elements are thin-film transistors; pixels are arranged in matrix form; and a pixel electrode and said thin-film transistor are provided for each region corresponding to each of said pixels.

10. The liquid crystal display device according to claim 9 wherein a direction of a maximum field component among field components parallel to said substrate surface substantially coincides with a direction of a helical axis in said liquid crystal material.

11. The liquid crystal display device according to claim 1 wherein active elements are formed on at least one of said pair of substrates.

12. The liquid crystal display device according to claim 11 wherein said active elements are thin-film transistors; pixels are arranged in matrix form; and a pixel electrode and said thin-film transistor are provided for each region corresponding to each of said pixels.

13. The liquid crystal display device according to claim 12 wherein a direction of a maximum field component among field components parallel to said substrate surface substantially coincides with a direction of a helical axis in said liquid crystal material.

14. A liquid crystal display device with continuous gray scale comprising:

a pair of substrates;

a liquid crystal material, having an antiferroelectric phase and an optical axis, sandwiched between said pair of substrates; and a pair of polarizing plates each having an optical axis and each coupled to one of said pair of substrates, the liquid crystal material having a dark state when the optical axis of one of said polarizing plates is matched to the optical axis of said liquid crystal material, wherein the liquid crystal has a bright state in response an electric field; and the liquid crystal material has continuous tone variations in response to variations in the intensity of the electric field, wherein the natural helical pitch of said liquid crystal material is smaller than twice a lower limit wavelength of a wavelength range of visible light.

15. The liquid crystal display device of claim 14, wherein said pair of polarizing plates have an axes of transmission that are mutually orthogonal.

16. The liquid crystal display device of claim 15, wherein said liquid crystal material has a natural helical pitch that is smaller than a gap between the pair of substrates.

* * * * *